March 19, 1935. J. H. GRAYSON 1,994,470
THERMOSTATICALLY CONTROLLED GAS VALVE
Filed July 29, 1933
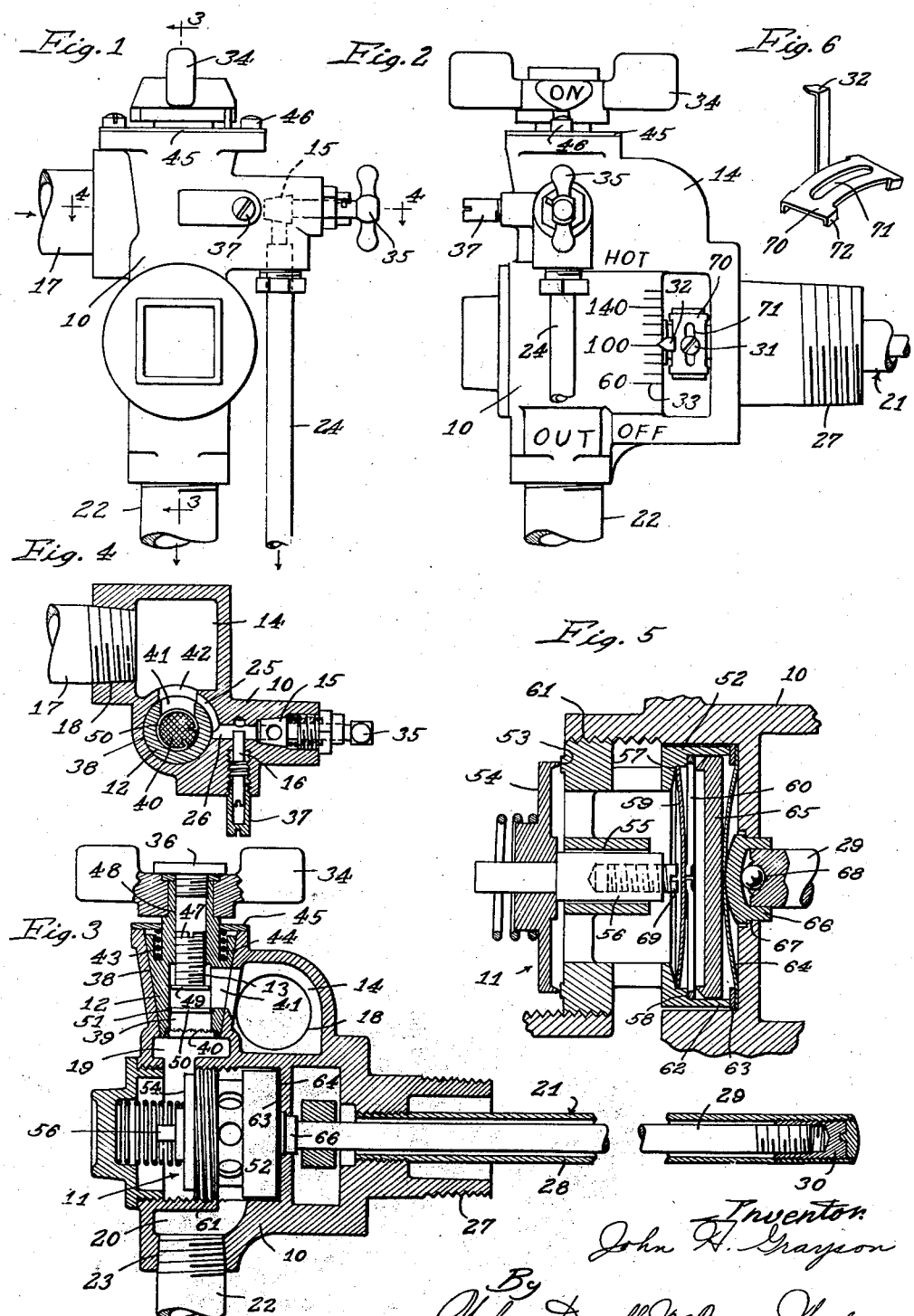

Patented Mar. 19, 1935

1,994,470

UNITED STATES PATENT OFFICE 1,994,470

THERMOSTATICALLY CONTROLLED GAS VALVE

John H. Grayson, Lynwood, Calif., assignor to Grayson Appliance Co., Ltd., Lynwood, Calif., a corporation of California Application July 29, 1933, Serial No. 682,785

22 Claims. (Cl. 236—102)

This invention relates to a new and improved thermostatically controlled gas valve especially designed and adapted for use with water heaters, but capable of use with other gas appliances.

In the past, it was customary to provide a separate shut-off cock at a convenient point in the gas line running to or from the thermostatic valve, but that required too many connections, which, besides being costly, gave rise to danger of gas leakage. It is, therefore, the principal object of the present invention to combine the shut-off cock with the thermostatic valve in one body, whereby to cut down the number of connections to an absolute minimum, and make for compactness of construction, neatness in appearance, and all around economy. The shut-off cock is furthermore embodied in the thermostatic valve in such a way that accurate and economical machining is facilitated.

Other objects of the invention are concerned with improvements in the shut-off cock and thermostatic valve with a view to compactness and ease in assembling, as well as insuring that the valve as a whole will be absolutely gas tight.

The invention is illustrated in the accompanying drawing, in which—

Figures 1 and 2 are a rear and side view, respectively, of the body of the valve showing the inlet and outlet pipes and the pilot connection;

Fig. 3 is a longitudinal section through the valve taken on the line 3—3 of Figure 1;

Fig. 4 is a cross-section on the line 4—4 of Figure 1;

Fig. 5 is a sectional detail on a larger scale showing the working parts of the thermostatic valve, and Fig. 6 is a perspective view of the sheet metal stamping serving as the pointer for use in connection with the temperature scale of the thermostat.

The same reference numerals are applied to corresponding parts throughout the views.

Referring mainly to Figs. 1 to 4, the numeral 10 designates the body or casing in which are incorporated a thermostatic valve 11, shut-off cock 12 with a flame adjusting restriction valve 13, dirt trap 14, pilot cock 15 and pilot adjustment 16. Gas is supplied from the main through pipe 17 threaded into an inlet opening 18 communicating with the dirt trap 14. The shut-off cock 12 and restriction valve 13 control and regulate the flow of gas from the dirt trap to the snap-action thermostatic valve 11. The latter is interposed between the inlet chamber 19 and outlet chamber 20, and is opened and closed according to the cooling and heating of the thermostat 21. Gas is conducted from the outlet chamber 20 through a delivery pipe 22 threaded in the outlet opening 23 and extending to the main burner of the water heater or other gas appliance in connection with which the valve is used. A tube 24 has communication with the inlet opening 18 through a by-passage 25 cored in the body 10 connecting the dirt trap chamber 14 with a bore 26 leading to the pilot cock 15. One may shut off the gas to the pilot burner by means of the cock 15 and may regulate the size of the pilot flame by means of the pilot adjustment 16. The valve body 10 has a threaded boss 27 for mounting the device on the wall of the tank of the water heater, with the thermostat 21 extending into the tank to be affected by the temperature of the water. The thermostat consists of a tube 28 and rod 29, the former being of copper or other material having a high coefficient of expansion, and the latter being of invar or any other suitable material substantially free from expansion and contraction with temperature change. A plug 30 in the outer end of the tube has the outer end of the rod threaded therein so as to move the rod inwardly upon contraction of the tube resulting from a drop in temperature, and move the rod outwardly when the tube expands as a result of a rise in temperature. The threaded connection is used for a temperature adjustment of the thermostat, the rod being adapted to be turned by means of a lever 31 fastened onto the inner end of the rod. As the rod is turned, a pointer 32 is moved relative to a temperature scale 33 so as to indicate the temperature setting.

It is apparent from the above description that a valve embodying the six features numbered 11 to 16, all in the one body 10, has many advantages over the old construction, not only from the standpoint that the number of pipe connections is reduced to a minimum, but also from the standpoint of the handiness with which the operator can manipulate the various parts. Thus, the handles 34 and 35 are both on the one valve, the handle 34 being for turning the shut-off cock 12 to turn the gas on or off for the main burner, and the handle 35 being for turning the pilot cock 15 to turn the gas on or off for the pilot burner. It is also quite convenient for the operator to adjust the size of the flame by means of the restriction valve 13, which is accessible upon removal of the cap 37. Considering the number of devices built into the one valve, the present device is extremely compact, and it presents a neat and attractive appearance on the heater or other gas appliance.

In accordance with one special phase of the present invention, it will be observed that the tapered bore 38 for the shut-off cock 12 is concentric and coaxial with the outlet opening 23 in the body 10. In that way, the body 10 may be screwed to a threaded arbor on the lathe, using the threaded hole 23, so as to have the part run true in the production of the bore 38. In other words, the design has been worked out so as to facilitate accurate and economical machining. The device is kept to a compact size by forming the boss for the dirt trap 14 alongside the bore for the shut-off cock, namely, in the angle between the shut-off cock and the main body portion of the valve (see Figs. 2 and 3). Aside from the advantage of compactness, there is the advantage that with this construction the gas supplied through the pipe 17 has its direction of flow changed abruptly to a course at right angles leading to the shut-off cock thus insuring the depositing of larger foreign particles in the dirt trap. The cock 12 has an axial bore 39 in the lower enlarged end of which a screen 40 is pressed so as to catch any smaller foreign particles in the passage of the gas into the inlet chamber 19 from the dirt trap 14. A hole 41 in the wall of the cock communicates with a port 42 in the body 10 to afford communication between the dirt trap chamber and the inlet chamber. When the cock is turned by means of the handle 34 from the position shown, the flow is, of course, shut off. A coiled compression spring 43 fits in an annular groove 44 provided in the shut-off cock 12 around the stem thereof, and is held under compression by a plate 45 fastened as by means of screws 46 onto the body at the outer end of the tapered bore 38. The spring holds the tapered shut-off cock seated in the bore 38 tightly enough to prevent leakage and yet loosely enough to allow the cock to be turned fairly easily. The recessing of the cock to accommodate the spring enables the use of a spring of the proper length and still keep the overall dimension down to a minimum, while affording the long bearing for the cock, which is important from the standpoint of preventing leakage.

The restriction valve 13 in the shut-off cock 12 consists of a screw 47 threading in a smaller bore 48 extending upwardly from the bore 39. The screw is entered in the bore 48 through the lower end of the cock because of the flanged portion 49 on the lower end thereof which is substantially of the same diameter as the bore 39. After the valve 13 is thus assembled in the cock 12, a split ring 50 is entered in an annular groove 51 provided in the bore 39 just below the opening 41, and thereafter the screen 40 may be pressed in place in the lower enlarged end of the bore. The ring 50 projects into the bore 39 sufficiently to serve as a stop for the valve 13 by engagement with the flange 49. In that way, there is no danger of one turning the screw 47 in the adjustment of the valve 13 far enough to leave the threaded bore 38 and possibly force the screen 40 from its position in the lower end of the cock. Furthermore, when the flange 49 engages the ring 50, the operator knows that at that point the flow is substantially completely cut off and he can therefore regulate the size of the flame accordingly by backing the screw away from the ring.

The thermostatic valve 11 is generally similar to that disclosed in my Patent #1,781,328. As disclosed in that patent, the bushing 52 provides a valve seat 53 for the valve disc 54, a guide 55 for the stem 56, and annular shoulders 57 and 58 for the snap-action diaphragm 59 and movement amplifying levers 60. The bushing in this instance is threaded in the body 10, as indicated at 61, and has its inner end 62 arranged to compress a gasket 63 against the margin of a dished diaphragm 64 to seal the body against leakage of gas. A push member 65 is slidable in the portion 62 of the bushing and has a projecting flange bearing upon the levers 60 near their supported outer ends, the inner ends of the levers having engagement with the disc 59 at the center thereof. A hardened steel cap 66 is slidable freely in a hole 67 in the wall of the body 10 and has a rounded face which bears against the center of the diaphragm 64 which in turn bears against the back of the push member 65 at the center. A hardened steel ball 68 is set in a recess in the end of the rod element 29 of the thermostat 21 and has point contact with the inside of the end wall of the cap 66 into which the rod 29 projects, as shown.

In operation, when the thermostat suffers a drop in temperature, the rod 29 moves to the left, as viewed in Figs. 3 and 5, flexing the diaphragm 64, and moving the push member 65 so as to exert pressure upon the levers 60. The levers 60 are resilient and flex under the pressure of the push member until they exert sufficient pressure at the center of the disc 59 to cause it to snap over dead center and open the valve, whereby to supply gas to the main burner of the appliance, which will be ignited by the pilot burner. The screw 69, adjustably mounted in the stem 56, transmits the movement of the disc to the stem 56 when the disc snaps over dead center. There is, of course, comparatively slight movement of the rod 29 to produce snap-action of the disc, the movement of the rod being amplified by the levers 60 and push member 65 cooperating therewith. For that reason, it is possible to utilize a part like the diaphragm 64 to serve as a seal. This diaphragm is, of course, of very thin and flexible metal in order to allow the flexing back and forth of the center thereof without affecting the seating of its marginal portion where the seal is made. The use of the hardened cap and hardened ball having point contact with one another and with the push member 65 through the diaphragm 64 makes for minimum wear of the parts and accuracy in the temperature adjustment of the thermostat.

In conclusion, it will be noticed that the pointer 32 is a sheet metal stamping in the form of a plate 70 bent to arcuate form to fit on the collar into which the lever 31 is screwed, and has an elongated slot 71 provided therein so as to permit adjusting the pointer one way or the other with respect to the lever 31 and bring the pointer to the proper position with respect to the scale 33 at the time of assembling. Later, in the event of wear of the parts, the lever 31 may be loosened sufficiently to permit re-setting the pointer, whereupon the lever may be tightened to hold the pointer in its adjusted position. The lugs 72 on the plate 70 hold the plate in place by engagement with the edges of the collar into which the lever 31 is screwed.

It is believed the foregoing description conveys a good understanding of the objects and advantages of my invention. The appended claims have been drawn with a view to covering all legitimate modifications and adaptations.

I claim:

1. In a thermostatic valve structure comprising a casing having a bore therein, a bushing inserted in said bore and dividing the casing into an inlet chamber and an outlet chamber, a valve seat provided on said bushing and a valve cooperating with said seat to control passage of gas from the inlet to the outlet chamber, a movable thermostatic element projecting into said casing adjacent the end of the bushing, a flexible diaphragm clamped in said casing by the end of said bushing to seal the casing against gas leakage past the thermostatic element, said thermostatic element having engagement with said diaphragm and adapted to communicate movement thereto at a point spaced from its clamped portion, and valve actuating means in said casing movable with said diaphragm.

2. In a thermostatic valve structure comprising a casing having a bore therein, a bushing inserted in said bore and dividing the casing into an inlet chamber and an outlet chamber, a valve seat provided on said bushing and a valve cooperating with said seat to control passage of gas from the inlet to the outlet chamber, said bushing having a bore in the end thereof remote from the valve seat, a push member slidable in said bore, valve actuating means mounted in said bushing in front of the push member and operated by the push member to operate the valve, said casing having an opening therein behind the push member, a sealing member for preventing escape of gas through said opening clamped by its marginal portions in said casing by engagement of the adjacent end of the bushing thereon, the central portion of said member having engagement with the back of the push member and being movable therewith, and a movable thermostatic element projecting into said opening and communicating movement to the central portion of the sealing member so as to move the push member.

3. A valve structure as set forth in claim 2 including a compressible gasket engaged by the marginal portion of the sealing member, said bushing being threadedly inserted in the casing and arranged when tightened to subject the gasket to compression in the clamping of the marginal portion of the sealing member, whereby to make an effective seal.

4. A valve as set forth in claim 2 including a hardened cap slidable in said opening and fitting over the end of the thermostatic element, having a rounded face making point contact with the center of the sealing member, the thermostatic element being rotatable with respect to said cap for temperature adjustment.

5. A valve as set forth in claim 2 including a hardened cap slidable in said opening and fitting over the end of the thermostatic element, having a rounded face making point contact with the center of the sealing member, and a hardened ball for communicating thrust from the end of the thermostatic element to the cap and having point contact with the latter, the thermostatic element being rotatable with respect to said cap for temperature adjustment.

6. In a thermostatic valve structure comprising a casing having a bore therein, a bushing inserted in said bore and dividing the casing into an inlet chamber and an outlet chamber, a valve seat provided on one end of said bushing and a valve cooperating with said seat to control passage of gas from the inlet to the outlet chamber, movable sealing means for preventing leakage from said casing held in place by the end of said bushing remote from the valve seat, snap action valve actuating means mounted in said bushing between the valve and sealing means and adapted to operate the valve abruptly upon a given movement of the sealing means, and a thermostatic element on the opposite side of the sealing means subject to temperature change and arranged upon such temperature change to communicate movement to the sealing means.

7. In a thermostatic valve structure comprising a casing having a bore therein, a bushing inserted in said bore and dividing the casing into an inlet chamber and an outlet chamber, a valve seat provided on one end of said bushing and a valve cooperating with said seat to control passage of gas from the inlet to the outlet chamber, sealing means for preventing leakage from said casing held in place by the end of said bushing remote from the valve seat, and thermostatically operated valve actuating means mounted in said bushing and adapted to operate the valve, the seal engaging end of said bushing having a bore provided therein, and said valve actuating means including a plunger slidable in said bore, and a thermostatic element for communicating movement to said plunger.

8. In a device of the class described comprising a casing, a valve in said casing to be opened and closed in accordance with temperature change to control communication between inlet and outlet chambers provided in said casing and a thermostat mounted on said casing and comprising a stationary tubular element fixed with relation to the wall of said casing, and a movable rod element therein extending into said casing into one of the chambers therein, valve actuating means including a plunger reciprocable in said casing adjacent the end of the rod element, and means providing an operating connection between the movable rod element of the thermostat, and said plunger comprising a hardened cap fitting over the end of the rod element and having a rounded face projecting toward the plunger whereby to operate the latter by point contact, the rod element being rotatable in said cap with respect to the tube element for a temperature adjustment.

9. In a device of the class described comprising a casing, a valve in said casing to be opened and closed in accordance with temperature change to control communication between inlet and outlet chambers provided in said casing, and a thermostat mounted on said casing and comprising a stationary tubular element fixed with relation to the wall of said casing, and a movable rod element therein extending into said casing into one of the chambers therein, valve actuating means including a plunger reciprocable in said casing adjacent the end of the rod element, and means providing an operating connection between the movable rod element of the thermostat, and said plunger comprising a hardened cap fitting over the end of the rod element and having a rounded face projecting toward the plunger whereby to operate the latter by point contact, and a hardened ball disposed between the end of the rod element and the cap and having point contact with the latter to transmit thrust from the rod to the cap and thence to the plunger, the rod element being rotatable in said cap with respect to the tube element for a temperature adjustment.

10. In a gas valve, the combination in a casing having an inlet chamber and an outlet chamber provided therein together with a valve for controlling the flow of gas from the inlet to the outlet chamber, an outlet opening provided in the wall of said casing adapted to receive a conduit for conducting gas from the outlet chamber, said opening extending substantially radially with respect to the casing, a bore provided in said casing on the diametrically opposite side thereof from the outlet opening and coaxial with the latter, the bore communicating with the inlet chamber, a shut-off cock rotatably mounted in said bore and having an L-shaped passage provided therein for discharging gas into the inlet chamber from the end of the cock, and said casing having an inlet opening communicating with said bore and with the other end of the L-shaped passage in the cock when the cock is turned in the bore to open position, said inlet opening being adapted to receive a conduit for conducting gas to the inlet chamber.

11. In a gas valve, the combination in a casing having an inlet chamber and an outlet chamber provided therein together with a valve for controlling the flow of gas from the inlet to the outlet chamber, an outlet opening provided in the wall of said casing adapted to receive a conduit for conducting gas from the outlet chamber, said opening extending substantially radially with respect to the casing, a bore provided in said casing on the diametrically opposite side thereof from the outlet opening and coaxial with the latter, the bore communicating with the inlet chamber, a shut-off cock rotatably mounted in said bore and having an L-shaped passage provided therein for discharging gas into the inlet chamber from the end of the cock, a dirt trap chamber provided in the side of said casing adjacent to and communicating with the L-shaped passage in the cock when the latter is turned in the bore to open position, and said casing having an inlet opening provided therein communicating with one side of the dirt trap chamber in such relation to the L-shaped bore of the cock to cause an abrupt change in direction of flow of gas in the dirt trap chamber to enter the passage, said inlet opening being adapted to receive a conduit for conducting gas to the inlet chamber.

12. A valve as set forth in claim 10 including a restriction valve adjustable lengthwise in said cock to regulate the flow of gas into that portion of the L-shaped passage which communicates with the inlet chamber.

13. A valve as set forth in claim 10 wherein the cock is tapered and the bore therefor is correspondingly tapered, the valve including a coiled compression spring fitting in an annular groove provided in the outer end of said cock and held in place by a plate closing the outer end of the bore.

14. In a gas cock, the combination of a body having a bore therein, a cock rotatable in the bore having an L-shaped passage provided therein for discharging gas through the end of said cock, the body having an inlet opening provided therein through which gas is delivered to the other or inlet end of said passage when the cock is turned to open position, a restriction valve adjustable lengthwise in the discharge portion of said passage and transversely with relation to the inlet portion of the passage to vary the flow of gas into the discharge portion of the passage, said valve having a threaded shank threadedly received in a bore communicating with the upper end of the passage, and a stop for limiting the closing movement of the restriction valve comprising a split ring entered by expansion into an annular groove provided therefor in the discharge portion of the passage below the inlet portion.

15. A gas cock as set forth in claim 14 including a screen in the outer end of the discharge portion of the passage below the snap ring, whereby to be protected by said ring against engagement of the restriction valve with the screen.

16. In a thermostatic valve comprising a casing, a thermostat thereon comprising a tubular element fixed on the casing, and a rod element in said tubular element threadedly connected at one end with the outer end of the tubular element and having the other end projecting into said casing for operating the valve in accordance with temperature change, and means for turning the rod element with respect to the tubular element comprising a lever projecting radially from a hub on the rod and having a reduced portion threaded in said hub, the casing having a suitable temperature scale thereon with relation to which the lever is arranged to be moved, a pointer movable with said lever and relative to said scale, the pointer having a supporting plate received on said hub and having an elongated slot provided therein to receive the threaded end of the lever, whereby to permit clamping said pointer by means of said lever and also permit adjustment of the pointer in either direction with relation to said lever in the plane of movement of the latter.

17. In a gas valve, the combination in a casing having an inlet chamber and an outlet chamber provided therein together with a valve for controlling the flow of gas from the inlet to the outlet chamber, an opening provided in the wall of said casing adapted to receive a conduit for conducting gas in one direction relative to the one chamber, said opening extending substantially radially with respect to the casing, a bore provided in said casing on the diametrically opposite side thereof from the first opening and coaxial therewith and communicating with the other chamber, a cock rotatably mounted in said bore having an L-shaped passage provided therein for communication with the casing through the end of the cock, said casing having an opening communicating with said bore and with the outer end of the L-shaped passage in the cock when the cock is turned in the bore to open position, said opening being adapted to receive a conduit for conducting gas.

18. A valve as set forth in claim 17 including a restriction valve adjustable lengthwise in said cock to regulate the flow of gas by restricting the communication of one leg of the L-shaped passage with the other leg of said passage.

19. A valve as set forth in claim 17 wherein the cock is tapered and the bore therefor is correspondingly tapered, the valve including a coiled compression spring fitting in an annular groove provided in the outer end of said cock and having abutment with means closing the outer end of the bore.

20. In a cock, the combination of a body having a tapered bore therein, a tapered cock rotatable in the bore having a passage provided therein for conducting gas from an inlet opening to an outlet opening provided in the body communicating with the bore, a compression spring fitting in an annular groove provided in the larger end of said cock, and means closing the larger end of the bore and having abutment with the outer end of said spring.

21. In a valve, the combination in a casing having an inlet chamber and an outlet chamber provided therein together with a valve for controlling communication between the inlet and outlet chamber, inlet and outlet openings provided in the wall of said casing on diametrically opposite sides thereof and in coaxial relation, the inlet opening communicating with the inlet chamber and the outlet opening communicating with the outlet chamber, one of said openings being threaded to receive the threaded end of a conduit to be connected with one of said chambers, the other of said openings being smooth and tapered, a tapered cock rotatable in said opening and having an L-shaped passage provided therein for communication with the chamber in the casing through the end of the cock, said casing having a third opening communicating with the side of the tapered opening and with the other end of the L-shaped passage in the cock when the cock is turned to open position, the third opening being adapted to receive a conduit to communicate with the other chamber in said casing through said cock.

22. A valve as set forth in claim 21 including a coiled compression spring fitting in an annular groove provided in the outer end of said cock and held in place by a closure closing the outer end of the tapered opening.

JOHN H. GRAYSON.